United States Patent [19]

Koehler et al.

[11] 4,270,167

[45] May 26, 1981

[54] APPARATUS AND METHOD FOR COOPERATIVE AND CONCURRENT COPROCESSING OF DIGITAL INFORMATION

[75] Inventors: Robert J. Koehler, Cupertino, Calif.; John A. Bayliss, Portland, Oreg.

[73] Assignee: Intel Corporation, Santa Clara, Calif.

[21] Appl. No.: 921,082

[22] Filed: Jun. 30, 1978

[51] Int. Cl.³ .............................................. G06F 15/16
[52] U.S. Cl. ................................................ 364/200
[58] Field of Search ............... 364/200 MS File, 741; 235/307; 340/146.1 BE, 146.1 C

[56] References Cited

U.S. PATENT DOCUMENTS

| 3,815,095 | 6/1974 | Wester | 364/200 |
|---|---|---|---|
| 4,000,485 | 12/1976 | Barlow et al. | 364/200 |

Primary Examiner—Raulfe B. Zache
Attorney, Agent, or Firm—Blakely, Sokoloff, Taylor & Zafman

[57] ABSTRACT

The data processing capacity of a practical semiconductor computer system, having both local and system buses, can be expanded both in degree of complexity and magnitude by providing a method and means for cooperatively and concurrently coprocessing digital information among a plurality of processors sharing the same local bus and collectively accessing the system bus as a system unit. In other words, a central processor has primary control and access to a local bus and may have access to a system or common bus shared among many other processors. Also sharing the local bus with the central processor is a plurality of specialized or dedicated processors which are continuously apprised of or actively monitor the internal operational status and operation then being performed by the central processor. The active monitoring of the activity of the other processors sharing the local bus distinguishes these dedicated processors from conventional direct memory accessing processors. Certain ones of the instructions fetched simultaneously by the central processor and the specialized processor from the system memory are reserved for execution in one of the dedicated processors which then shares the local bus with the central processor by means of communicating through a plurality of signals with respect to the status, mode, arbitration, and control of the local bus.

21 Claims, 11 Drawing Figures

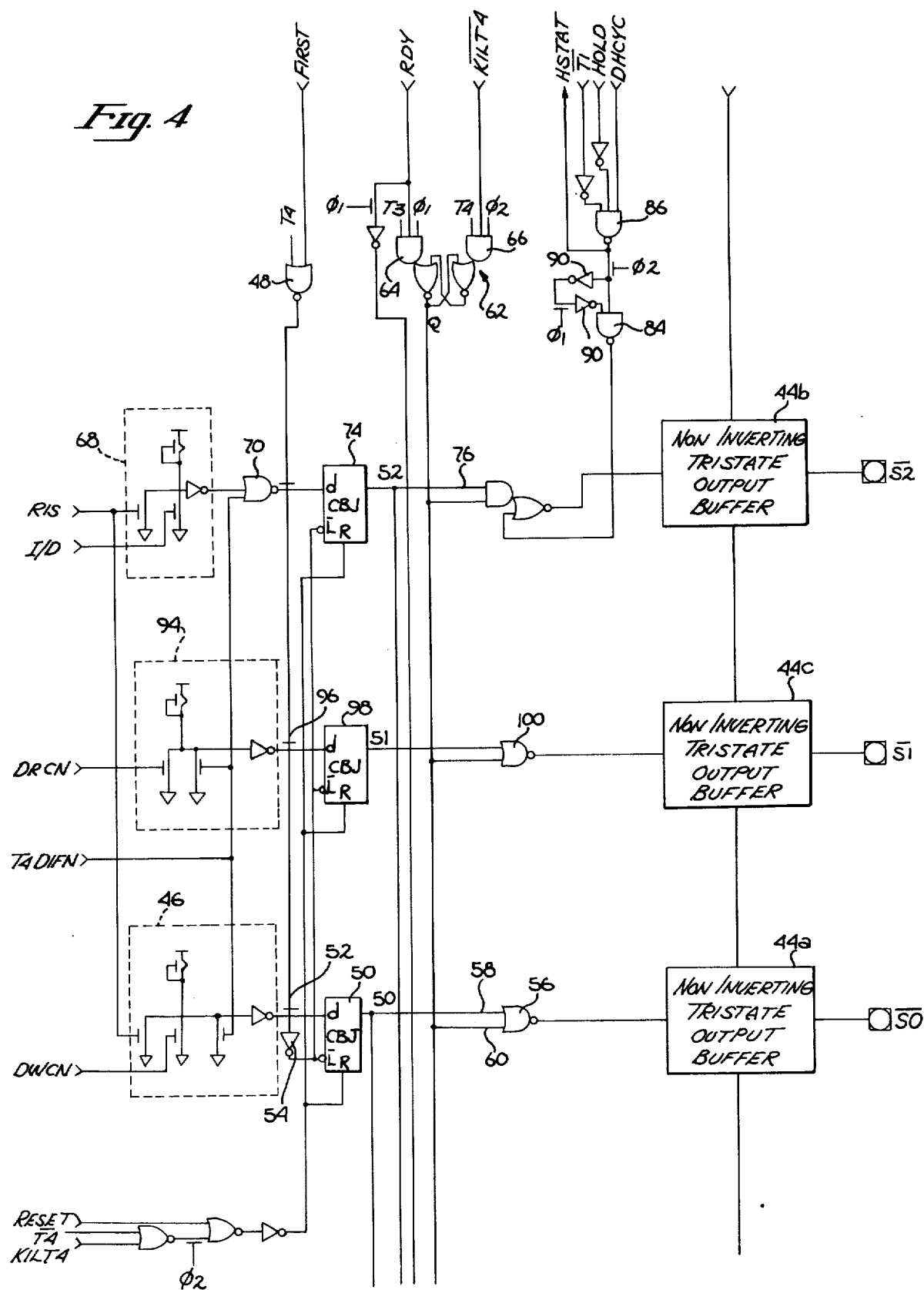

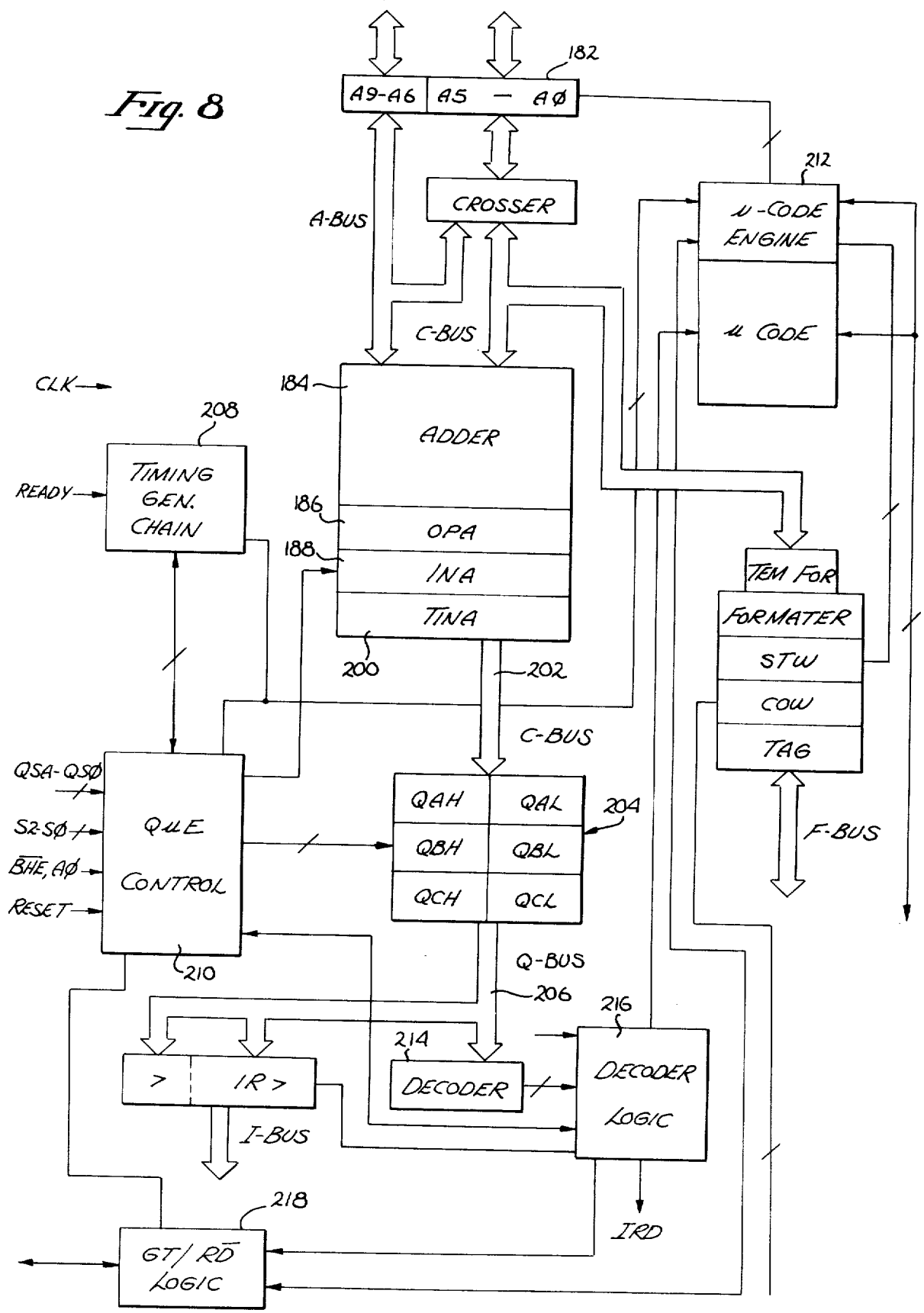

APPARATUS AND METHOD FOR COOPERATIVE AND CONCURRENT COPROCESSING OF DIGITAL INFORMATION

BACKGROUND OF THE INVENTION

1. Field of the Invention

The present invention relates to the field of system organization of data processors and in particular relates to the field wherein a plurality of processors share a local bus to access and control a system bus and/or a private bus, and wherein this plurality of processors share resources for controlling the private and system buses. In configurations displaying both private and common buses, the plurality of processors on the local bus uses resources located on the private bus when it is not using resources located on the common bus. Traditionally, private bus resources have included instruction memory, non-intelligent peripherals such as latches and intelligent peripherals such as direct memory access devices, serial interface devices and peripheral controller processors.

2. Description of the Prior Art

As the cost of integrated circuit, semiconductor microprocessors continues to decrease and as their acceptance continues to increase, an accelerating number of applications are found wherein such microprocessors can be organized to intelligently perform a plurality of complex computing operations which cannot be performed by a single integrated circuit made by presently known technology. Thus, microprocessors which may have been previously dedicated to rather simple operations requiring a high number of simple repetitive steps are increasingly required to be adapted to applications wherein the complexity and intelligence required to perform the operations is much greater than can be accomplished by previously known methods and circuits.

Prior art and state of the art microprocessors are limited by process and packaging restrictions due to a limited manufacturable size of the semiconductor chip and package. The demand for increased computing capacity to perform complex operations has exceeded the present ability to provide sufficient circuitry within the size limitations of manufacturably practical and cost competitive microprocessors.

Therefore, various organizations wherein a plurality of microprocessors have been organized to share either a private bus or a system or common bus have been devised to distribute computing capacity among a plurality of modules. Common bus is taken to mean a bus which is shared by a plurality of processors which either execute unrelated tasks using shared resources (peripherals) or which execute a single task by partitioning the execution among the plurality of processors. Generally, in such prior art systems a single microprocessor, or direct memory access unit under control of the microprocessor, performs all the required operations with respect to a local bus and shares a system bus with other processors. In this manner, peripheral circuitry, which are shared resources which perform various ancillary functions, can be serviced over a single system bus with the required intelligence or computing capacity distributed among a plurality of single processor controlled local buses. Nevertheless, the demand for complex computing operations has continued to the point where prior art microprocessors which execute a single instruction stream cannot perform the needed local bus operations without having extended computing capacity.

What is described herein is an apparatus and methodology for cooperative and concurrent coprocessing which overcomes each of the shortcomings of the prior art.

BRIEF SUMMARY OF THE INVENTION

The present invention is a method for processing digital information in a plurality of processors which share a local bus and which have selective access to, and control of, a system bus. Each processor of the plurality of processors has a means for queuing and decoding an instruction stream comprised of instructions which are freely interleaved among the plurality of processors with the instructions being jointly, independently and distributively executed by the several processors. Joint execution is performed when two or more processors perform a single instruction, wherein one processor performs the input phase and a second processor performs the output phase. Independent execution is performed when one of the processors performs an instruction in a dedicated manner without the assistance of another processor other than possible performance of a fetch. Distributive execution is performed when a dedicated or special processor gains control of the local bus and passes an operand address to central or primitive processor for a fetch. The method comprises the steps of generating a plurality of queue status signals and processor status signals in the first processor. The queue status signals are indicative of the status of the means for queuing and decoding instructions in a first processor. The processor status signals are indicative of the operation then being performed by the first processor. The queue and processor status signals are transmitted as part of the signals on the local bus. Access to the local bus is selectively controlled among the plurality of processors by the first processor in response to requests received by the first processor from one of the other processors in the plurality of processors.

The step of selectively controlling access to the local bus includes the steps of receiving the queue and processor status signals from the local bus wherein these signals are received by a second processor. The operation of the first processor is then tracked, and the means for queuing and decoding instructions is replicated in the second processor. The second processor detects at least one of the instructions as being designated for execution by the second processor. The second processor then requests the first processor to temporarily relinquish access and control over the local bus and to temporarily give the second processor access and control thereover, while still permitting the first processor to continue execution of instructions residing in its queue in a nonaccessing mode with respect to the bus. While the dedicated processor is executing its instruction, it returns control of the local bus to the central processor which continues with the instruction stream. To prevent the central processor from using an operand which has not been updated by the special processor, a means is provided by which the central processor automatically checks the completion of the prior instruction.

In another embodiment of the present invention in further combination with a means for arbitrating access and control over the system bus, the method further comprises that the steps of selectively generating a lock signal and transmitting the lock signal to the means for arbitrating access and control over the system or common bus. The lock signal is indicative of an instruction executed by the first processor to cause the plurality of processors to unconditionally retain access and control over the system or common bus through the means for arbitrating access and control for the collective benefit of the plurality of processors.

The present invention also includes a circuit in a first processor having a means for storing and queuing a plurality of instructions wherein the first processor has selective access and control to a local bus shared by the first processor and at least a second processor. The circuit is comprised of a first means for generating a plurality of bus control and queue status signals indicative of the status of the means for storing, queuing and decoding instructions. A second means generates a plurality of processor status signals indicative of the operation then being performed by the first processor. A third means selectively controls access to the shared local bus. By this combination the status and mode of operation, present and future, of the first processor is transmitted to the shared local bus and the first processor is permitted to arbitrate control and access over the shared local bus as determined by requests received by the first processor from the plurality of processors in response to the queue and processor status signals generated by the plurality of processors.

In one embodiment a circuit is included within the second processor and further comprises a fourth means which receives the queue and processor status signals, tracks the operation then being performed by the first processor and replicates in the second processor the means for storing, queuing and decoding the instructions which is in the first processor. A fifth means is provided for detecting at least one predetermined one of the plurality of instructions for distributed execution between both processors or dedicated execution within the second processor and for communicating with the third means to selectively cause the first processor to temporarily relinquish access and control over the local bus and to temporarily give the second processor access and control thereover. A sixth means for monitoring the activity of the second processor to determine if the second processor can accept the next instruction or has completed execution of an instruction whose result is needed prior to execution of an instruction by one of the plurality of processors. This synchronization permits the plurality of processors to execute instructions from a common instruction stream. By this combination of circuitry the plurality of the instructions is cooperatively and concurrently coprocessed by the first and second processors with the result that the digital processing capacity is extended and increased.

In yet another embodiment in further combination with the system bus and a means for arbitrating access and control over the system bus, the circuit of the present invention further comprises a seventh means for selectively generating a lock signal and for transmitting the lock signal to the means for arbitrating access and control over the system bus. The lock signal is indicative of an instruction executed by the first processor to unconditionally retain access and control over the system bus for the collective benefit of at least the first and second processors.

These and other embodiments of the present invention may be better understood by reviewing the Detailed Description of the Preferred Embodiments in light of the following Figures.

BRIEF DESCRIPTION OF THE DRAWINGS

FIG. 4 is a simplified schematic illustrating a plurality of output buffers in combination with a portion of a timing and logic circuit of the central processor;

FIG. 8 is a simplified block diagram of a portion of the circuitry of a processor handling dedicated computing operations which concurrently coprocesses information with the central processor of FIG. 2;

DETAILED DESCRIPTION OF THE PREFERRED EMBODIMENT

General Description

Figure 1:
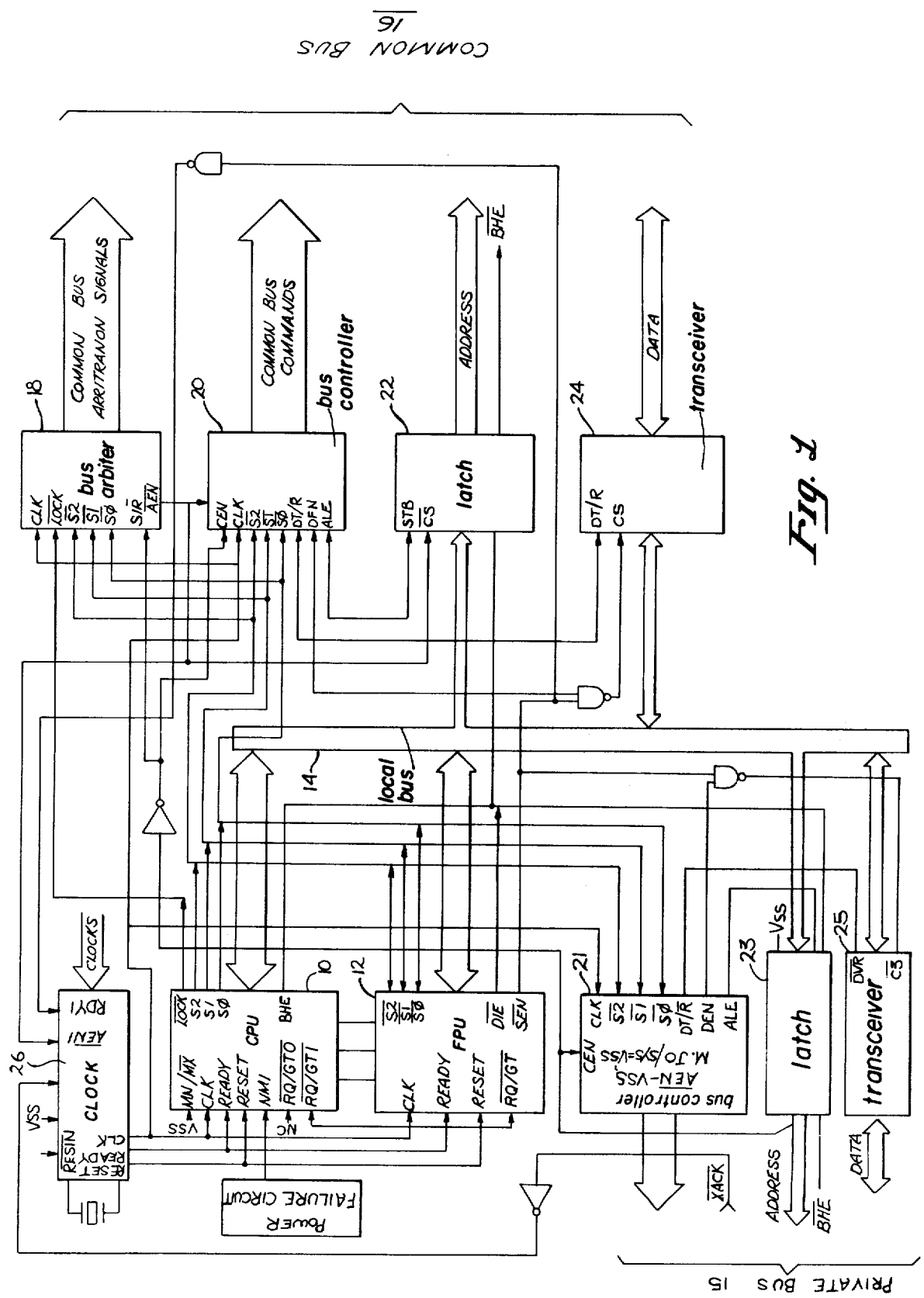
FIG. 1 is a block diagram showing a central processor and a floating point processor coupled to a local and system bus according to the present invention.

The present invention is an apparatus and methodology for expanding the computing capacity and ability of practical, economical semiconductor integrated circuit processors. A central processor, such as the type described in the copending applications entitled "Extended Address, Single and Multiple Bit Microprocessor," Ser. No. 873,777 filed Jan. 31, 1978, and "System Bus Arbitration, Circuitry and Methodology," Ser. No. 921,083 filed June 3, 1978, each assigned to the same assignee of the present invention, may be used as described in connection with the present invention. However, it must be understood that many other processors other than that described in the above copending applications may employ the apparatus and method of the present invention for increasing computing capacity. For example, in some embodiments of the present invention it is not necessary that the central (primitive) processor have an internal instruction queue.

The processor handling the more primitive or fundamental operations is associated with one or more processors having a specialized or dedicated computing capability, such as a floating point processor dedicated to the execution of specialized floating point arithmetic operations. Both the primitive processor and each of the corresponding specialized or dedicated processors share the same local bus and collectively have access to resources on a private bus as well as having access to the system or common bus subject to a partitioning of the decision making circuitry among the several processors, together with such ancillary or supportive circuitry as may be required to effect system access or control.

According to the present invention, the primitive processor and the various associated operationally dedicated processors simultaneously receive the instructions on the local bus and cooperatively process the instructions. For example, one or more dedicated microprocessors track the operation of the stand alone primitive processor. One subset of the instruction set is designated for execution by each of the dedicated processors. The primitive processor (hereinafter referred to for convenience as the "central processor" or "CPU") fetches each of the instructions and in the process of fetching the instruction makes the instruction available on the local bus. Upon decoding this instruction simultaneously with the CPU, for those instructions which require data access the CPU calculates the effective address for the dedicated processor and makes it available on the local bus by initiating the data transfer, the dedicated processor requests control of the local bus from the central processor, which at the appropriate time grants access and control to the local bus, having previously fetched the specialized instruction. The dedicated processor then executes the instruction with an appropriate access to the private or common or system bus as required by the instruction. However, not all instructions executed by the dedicated processor will necessarily require access to a bus. Meanwhile, the central processor may continue to execute instructions stored within a queue or other internal storage in the central processor as long as these instructions do not require access to the local bus. Upon completion of any bus access required for the execution of the instruction by the dedicated processor, the central processor may accept control and access of the local bus upon authorization by the dedicated processor according to the present invention. The dedicated processor may continue to execute its instruction even after control of the local bus has been returned to the CPU. The dedicated processor notifies the CPU that the result of its operation is completed so that the CPU does not try to use a result computed by the dedicated processor before it is in fact computed. The CPU may continue operation as long as it does not require the results of the dedicated processor's computation, and the dedicated processor may reacquire access and control over the local bus to effect any data transfers to a private or common bus which it may require. Thus, the CPU and dedicated processor concurrently execute instructions in real time and cooperatively process a stream of instructions. Therefore, it can be readily appreciated that a program stream of instructions is simultaneously tracked by both the central processor and each of the dedicated processors and that the instruction steam is collectively executed in a coopertive manner among the processors in a concurrent manner. Thus, the processors concurrently and cooperatively coprocess the digital information.

The present invention and its various embodiments may be best understood by viewing FIG. 1. FIG. 1 illustrates a simplified block diagram of the central processor 10 and a dedicated processor 12, a floating point processor, sharing a local bus 14. The processors 10 and 12 collectively have selective access and control of both a private bus 15 and a common or system bus 16. In the illustrated embodiment processors 10 and 12 access system bus 16 by means of a plurality of supportive or ancillary circuits which include a bus arbiter 18, a bus controller 20, an address latch 22 and a data latch 24.

Private bus 15 does not require use of an arbiter. The operation of one embodiment of bus arbiter 18 and bus controller 20 is set forth in detail in the copending application entitled "System Bus Arbitration Circuitry and Methodology" referenced above. However, many arbitration schemes and means for coupling processors 10 and 12 to a system bus 16 may be employed other than that referenced without departing from the scope and spirit of the present invention. In addition, a private bus 15 is accessed by processors 10 and 12 in a nonarbitrated mode through bus controller 21, address latch 23 and data transceiver 25.

System Clock

CPU 10 and FPU 12 each derive their timing from an external clock circuit 26. Clock circuit 26 is a conventional crystal controlled clock which, among other system signals, provides a CLK signal generated by a conventional high current driver. The advantage of driving a plurality of separate processors with a single external clock is that it avoids problems of timing skews and synchronization which might otherwise result if each processor ran from a clock driver dedicated to itself, i.e., generated by a common chip clock with an output for each processor, had its own separate internal clock or was in some way synchronized to logic control signals which were derived in part from a single clock, such as the master clock within the central processor. Performance is increased because circuitry can easily be designed to eliminate skew problems. For example, one processor can be changing information on the same clock edge as another is trapping information. By using a single clock driver as shown in FIG. 1, no synchronization or skew problems occur between the clock derived data and control signals of processor 10 or 12. This type of clocking vastly simplifies the implementation and increases the performance of the cooperative and concurrent coprocessing which characterizes the combination of processors 10 and 12. Although only two processors are illustrated in FIG. 1, it is within the intent of the present invention that a substantially greater number of processors could be employed associated with the provision of a single external high current drive clock 26 thus easily allowing for the addition of a substantially greater number of processing units.

Central and Operationally Dedicated Processor Protocol

Communication between central processor 10 and dedicated processor 12, in the illustrated embodiment, is achieved principally by three categories of signals: queue status and instruction decode signals; processor status signals; and request/grant control signals. The processor status signals S0, S1, and S2, comprise a three bit field which encodes the type of operation then being executed. For example, as set forth below in TABLE 1 is a summary of one encoding which may be used for the processor status signals.

TABLE 1

|     | S2 | S1 | S0 |                              |      |
|-----|----|----|----|------------------------------|------|
|     | 0  | 0  | 0  | Interrupt/Acknowledge        |      |
| I/O | 0  | 0  | 1  | Read IO port                 | I/O  |
|     | 0  | 1  | 0  | Write IO port                |      |
|     | 0  | 1  | 1  | Halt                         | Halt |
|     | 1  | 0  | 0  | Code access (datum into queue) |    |
| Mem | 1  | 0  | 1  | Read Memory                  | Mem  |
|     | 1  | 1  | 0  | Write Memory                 |      |
|     |    |    |    |                              | No   |

TABLE I-continued

| S2 | S1 | S0 | | |
|---|---|---|---|---|
| 1 | 1 | 1 | Passive | Operation |

Similarly, the queue status signals, QS0 and QS1 provide an encoded two bit field pertaining to the status of the instruction queue and instruction decode within processor 10. It should be noted that S2–S0 are also used as queue status signals to identify when the queue is being loaded, i.e. code access. Summarized below in TABLE 2 is one encoding which may be used for the queue status signals. Again, in embodiments where an instruction queue is not included within the processor 10, such status signals would be omitted. However, to omit such queue status signals a substantial part of the CPU would have to be replicated to provide duplicate information.

TABLE 2

| QS1 | QS0 | |
|---|---|---|
| 0 | 0 | No operation |
| 0 | 1 | First byte of opcode from queue |
| 1 | 0 | Empty queue |
| 1 | 1 | Subsequent byte from queue |

Figure 6:
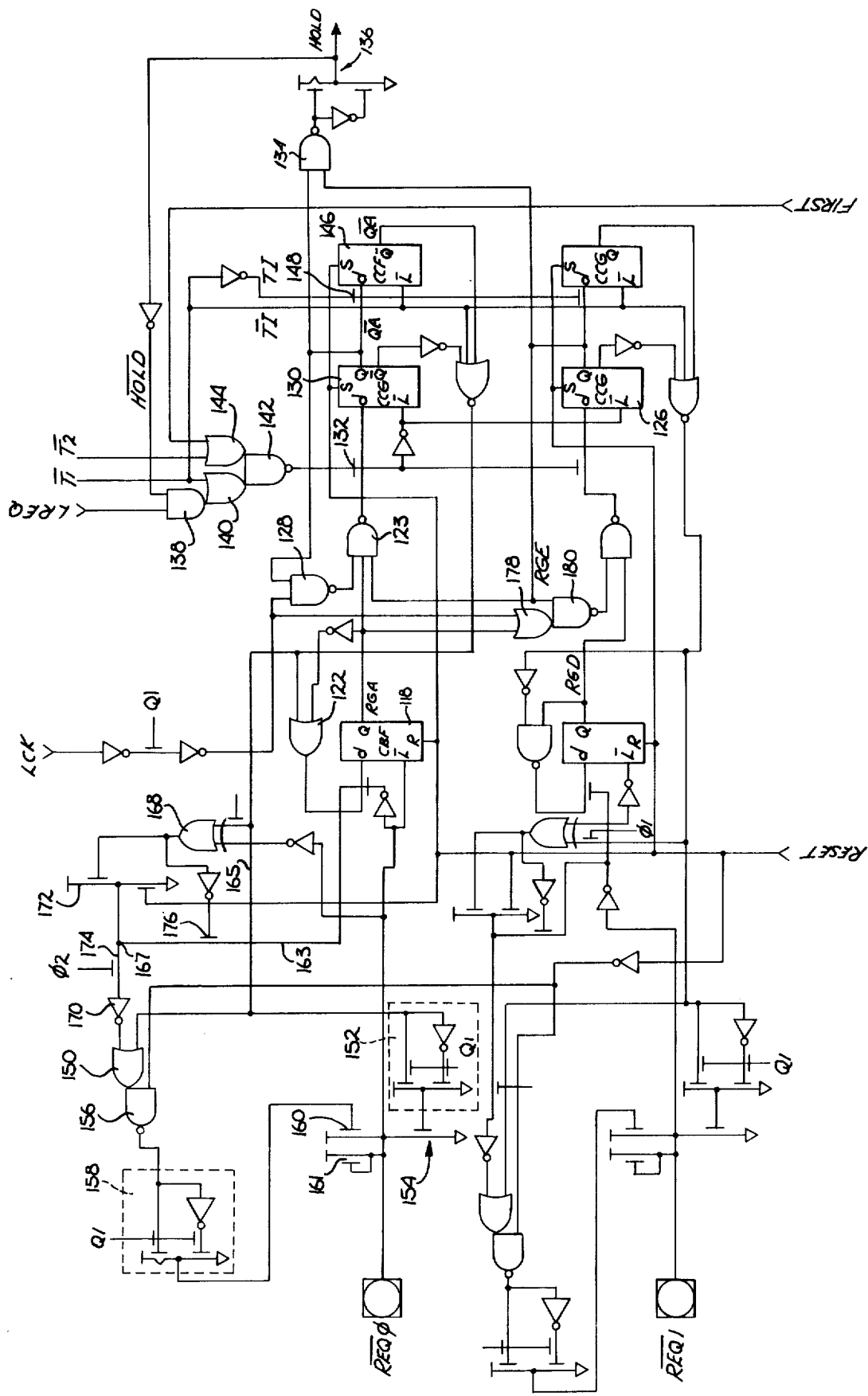
FIG. 6 is a simplified schematic diagram showing one embodiment of the request/grant circuitry in the central processor.

The queue status signals allow the dedicated processor to decode or find its instruction. The request/grant control signals may be taken to include the signals RQ/GT0, RQ/GT1. The RQ/GT signals are bidirectional signals with respect to processors 10 and 12 which are used to communicate or arbitrate control over the local bus between the processors. Two request/grant pins or terminals are illustrated in FIG. 1 in processor 10 and have an ordered priority. Clearly, many additional request/grant terminals could be included in the manner described herein as shown in FIG. 6.

Figure 7:
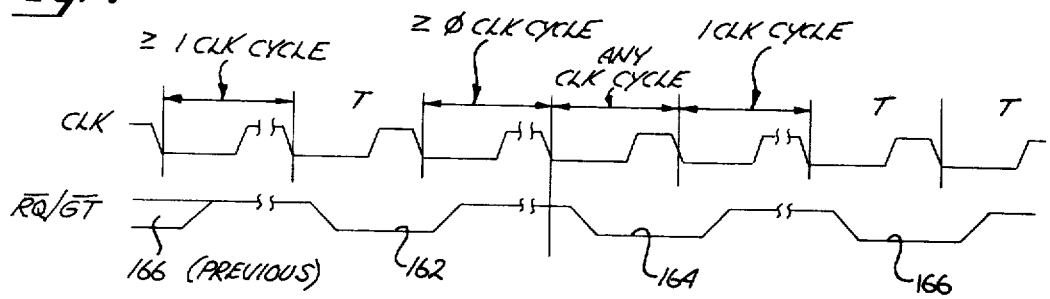
FIG. 7 is a timing diagram showing the request/grant timing of the illustrated circuitry.

The request/grant sequence generally involves the exchange of three clock pulses as shown in FIG. 7. A first pulse, one clock wide, is received by processor 10 from processor 12 to indicate a request for control of the local bus to processor 10. A second pulse one clock wide from processor 10 to the processor which requested the local bus, which in the illustrated embodiment is processor 12, indicates that processor 10 has placed or is about to place its output drivers which are coupled to local bus 14 in a high impedance state and that processor 10 will execute instructions in its queue as long as the local bus is not required or if the local bus is required enter an idle state or nonoperational mode to wait for the local bus to become available. A third pulse, one clock wide, generated by processor 12 through the request/grant pin to processor 10, indicates to processor 10 that it has completed or is about to complete one or more transfers over the local bus and that processor 10 may reclaim local bus 14 at the end of the next clock. Each master-master exchange of local bus 14 is a sequence of three pulses, each of which in the illustrated embodiment is active low. After each local bus exchange, one dead clock cycle is observed, but in the general case, is not required.

The TEST pin is an input to processor 10 and is examined by a software prefix instruction by means of a conventional microcode circuit, which instruction may be referred to as a "wait for test" instruction. If the TEST pin is active, execution of the instruction stream continues, otherwise processor 10 waits in an idle state. A BUSY signal is generated by processor 12 as a result of the decoding of one of its instructions from the instruction stream to indicate that it is then executing an instruction whose result must be achieved before certain other instructions in the stream can be processed by itself or one or more other processors. In many instances processor 12 may return control of local bus 14 to processor 10 while still being internally engaged in the execution of one or more instructions. One or more dedicated processor instructions which do not require the result of prior, as yet unexecuted, dedicated processor instructions are inserted into a second queue of processor 12. In such instances, processor 10 will be granted control of bus 14 so that it can continue execution of the instruction stream. However, processor 12 may make a local bus request at any time since it may need control of the local bus. For example, processor 12 may require bus 14 to write the result of an operation into memory or to read an operand from memory, to dump its status into memory in response to a dump instruction or to acquire other dedicated instructions from the queues of other like dedicated processors. In order to avoid the premature execution of the instruction which needs the results of the instruction currently being executed by processor 12, or which needs processor 12 on line for joint processing or the initial joint processing of the next instruction, TEST will first be examined by processor 10 to determine if processor 12 is busy and if so wait in an idle state until processor 12 responds by driving TEST inactive. TEST is generated by conventional means in processor 12, such as by a status decoder coupled to a flip-flop and buffer to generate a TEST signal whenever processor 12 is busy as set forth above. When the TEST signal goes inactive, processor 10, which may have entered an idle state, is permitted to continue with the execution of the instruction stream.

Many other input and output signals are also illustrated in FIG. 1 with respect to processors 10 and 12. These signals include such conventional signals as READY which is an input signal which is indicative of acknowledgement from the addressed memory device that it has completed the data transfer. Generation of RESET causes the processor to immediately terminate its activity and enter its dormant state. Execution is restarted when the RESET signal goes inactive. Byte high enable, BHE, is an output signal which is used to enable data onto the most significant half of a two byte data bus, as described in greater detail in the copending application entitled "Apparatus and Method for Providing Byte and Word Compatible Information Transfers," filed on May 30, 1978, Ser. No. 910,103 and assigned to the same assignee of the present invention. As described therein the first bit of the multiplexed address/data bus line, AD0, functions as a byte low enable signal to analogously enable data on to the least significant half of the two byte data bus.

Organization of the Central Processor

Figure 2:
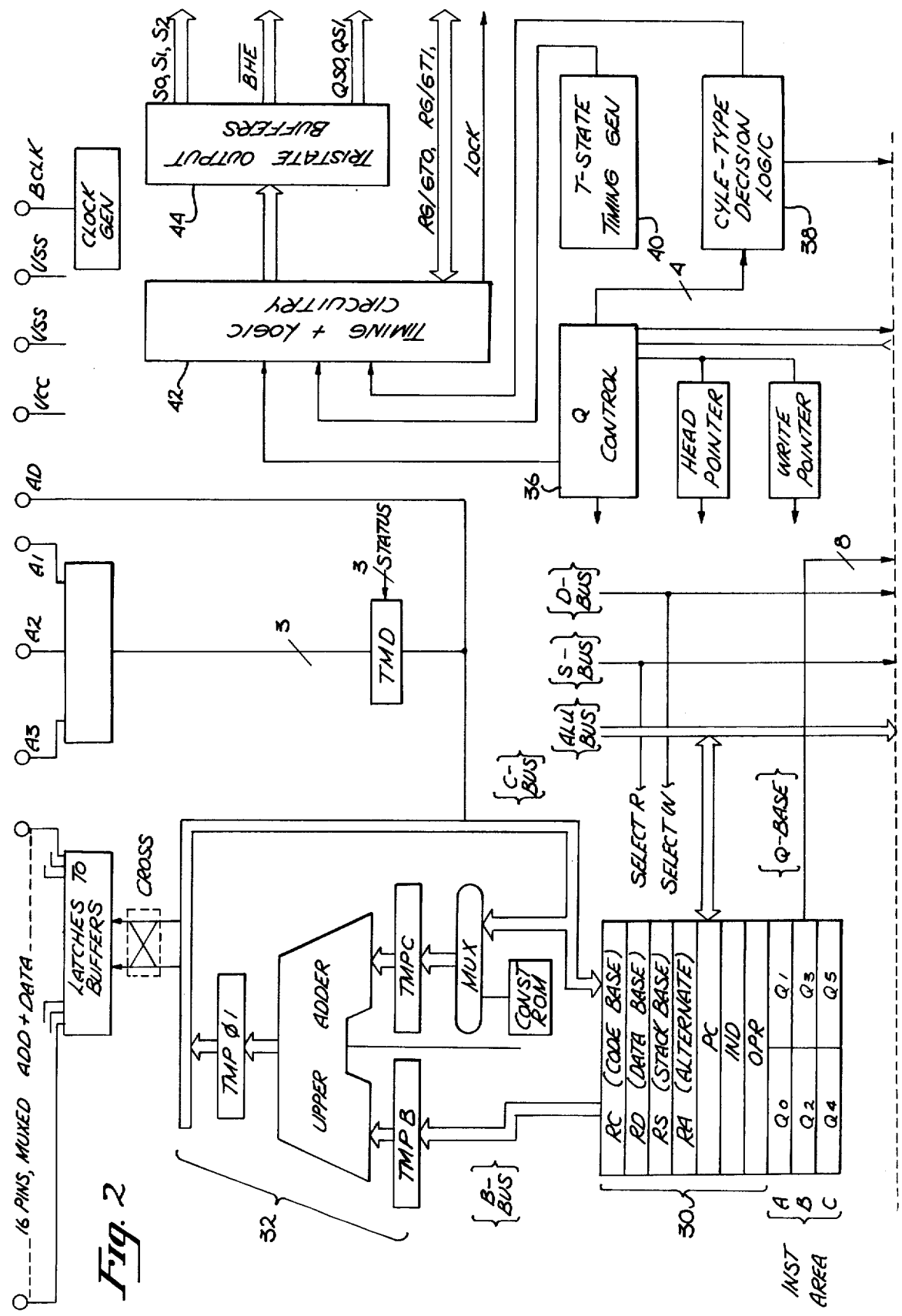
FIG. 2 is a simplified block diagram of a portion of the central processor illustrated in FIG. 1.

FIG. 2 illustrates in simplified block form a portion of the architecture of processor 10 according to the illustrated embodiment as described in greater detail with respect to the above referenced copending application entitled, "Extended Address, Single and Multiple Bit Microprocessor." In particular, FIG. 2 illustrates the upper control portion of processor 10.

Processor 10 is characterized in part by an instruction queue 28 which is diagrammatically illustrated as including six paired registers of byte length, Q0 through Q5. Each of the consecutive pairs can be coupled to form a word length register. Instructions are fetched from an external memory which holds the instruction stream common to all coprocessors and placed within queue 28. A plurality of registers 30 is provided for addressing functions and operational requirements as discussed in the above referenced copending application. Similarly, a dedicated adder 32 and associated temporary registers and buses are combined with the upper file registers, including queue 28 and registers 30, to complete the addressing functions of processor 10 as coupled to the twenty address pins A0–A19 as illustrated in FIG. 2.

Instruction bytes stored within queue 28 are transferred along an internal queue bus 34 according to the control of queue control logic circuitry 36, which is comprised of random logic circuitry of conventional design to conditionally generate a plurality of internal discrete command signals. Queue control circuit 36 provides the housekeeping functions which would normally be expected with the filling, emptying and organization of a multiple byte queue of registers. A plurality of internal discrete control signals are provided from queue circuit 36 to cycle type decision circuit 38, also comprised of similar conventional random logic circuitry and which also receives a similar plurality of discrete control signals from the lower execution unit.

Figure 3:
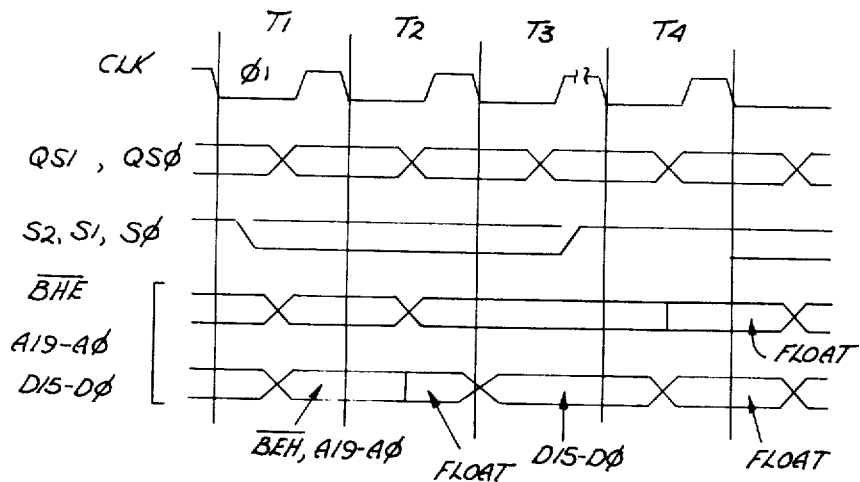
FIG. 3 is a timing diagram of some of the signals generated and received by the central processor of FIG. 1.

The T state timing generator 40 generates the "T" and "100" clock signals. For example, the T state generator generates the discrete clock signals T1, T2, T3, and T4. Addresses are normally generated in processor 10 during T1 and data transfer occurs on local bus 14 during stages T2 through T4. In the event that a resource (i.e. memory, peripheral, etc.) located on the common, private or local bus is not ready to receive information, a plurality of "T" wait states, TW, may be inserted between T3 and T4. Each "T" wait state has the same duration as one of the T1 through T4 clock cycles. In addition, a plurality of idle states may be inserted between bus cycles, to wit after T4 and before the following T1. The relationship of the "T" cycles to processor status signals, S0–S2, to the queue status signals, QS0 and QS1, and to BHE is best shown in the timing diagram of FIG. 3. It should be further noted that each "T" cycle is comprised of two asymmetric clock pulses denoted as $\phi 1$ and $\phi z$. $\phi 1$ and $\phi 2$ are strictly repetitive and are unaffected by instructions. "T" state generator 40 is of conventional design well known to the art. For example, "T" state generator 40 can be fabricated from a plurality of flip-flops to define the current "T" state, and supported by plurality of ancillary flip-flops ultimately coupled to the lower execution unit of processor 10 by means of a corresponding plurality of discrete control signals in order to intelligently track or respond to the instruction flow. The "T" states are appropriately generated according to the instruction in execution. The "T" and $\phi$ timing signals are then combined in timing and logic circuitry 42 with a plurality of discrete internal control signals derived from cycle type decision circuit 38.

The discrete internal control signals may then be logically combined and timed for transmission to corresponding plurality of conventional or three state output buffers 44. A "tristate" circuit is generally understood to denote a three state circuit which is able to assume both binary logic levels as well as a high impedance state. The output of buffers 44 include the processor status signals S0–S2, BHE, and the queue status signals, QS0 and QS1 the last two of which need not be tristated. In addition, timing and logic circuitry 42 generates the bidirectional request and grant signals RG/GT0 and RG/GT1 as well as the discrete control signal, LOCK.

Status Signal Circuitry

FIG. 4 illustrates the relevant portion of circuits 42 and 44 for the generation of the processor status signals S0–S2. Consider for example the processor status signal S0. Internal discrete control signals, "do write cycle next," DWCN; "interrupt acknowledge cycle," IACK; and "T4 do instruction fetch next," T4DIFN, are provided as inputs to a conventional OR gate 46. The output of the gate 46 is high if any one of these inputs is true. Reference to TABLE 1 will show that S0 assumes a logical zero in each of these instances. The output of gate 46 is synchronized by AND gate 48 whose inputs are T4 of the last instruction and the internal control signal, FIRST, to time the setting of flip-flop 50.

FIRST is derived by conventional means from circuit 38 and signifies that the first transfer of a single or multiple bus transfer is to be run. Processor 10 is capable of accessing instructions and data either on even or odd address boundaries. In the case of a word having a first byte beginning on an odd address, a two step fetch or two bus transfers are required. Internal discrete control signal, FIRST, is used in part to implement the ability of processor 10 to make both even and odd address fetches.

The output of gate 46 is enabled to the D input of flip-flop 50 by means of gate 52. Flip-flop 50 is loaded in response to the output of AND gate 48 being true. Inverter 54 prevents the D flip-flop from refreshing itself with its previous state while it is being loaded. Flip-flop 50 is a conventional dynamic MOS D-type load flip-flop or memory cell having two coupled inverters each having inputs synchronized by $\phi 1$ and $\phi 2$ respectively and a feedback loop gated by $L$. Each of the flip-flops described herein are of the same general design and operation. The output of flip-flop 50 is then coupled to input 58 of NAND gate 56. The other input 60 is coupled to the output of RS NOR gate latch of flip-flop 62. The reset input to latch 62 is provided by AND gate 64 while the set input is provided by AND gate 66. Inputs to gate 66 are T4, $\phi 2$ and $\overline{KILT4}$ which is an internal discrete control signal which when active low prevents bus cycle status from being communicated to the external world whenever the internal operation of processor 10 dictates that a bus cycle is not to be run. Thus S0 is driven active low, since if one of the internal control conditions for S0 has been decoded, input 58 of gate 56 will also be high. A low output is then coupled to a conventional noninverting tristate output buffer 44a to signify, active low, $\overline{S0}$. The inputs to gate 64 are T3, $\phi 1$ and RDY which is an internal control signal generally signifying that the addressed peripheral has acknowledged that it is ready to accept the transfer of digital information. In the event that RDY has not been driven high by an acknowledgment, a plurality of TW states may be inserted between T3 and T4. When RDY is high input 60 of gate 56 goes low on T3 $\phi 1$ and a high output is then coupled to a conventional noninverting tristate output buffer 44a to signify inactive high $\overline{S0}$.

Similarly, as shown in FIG. 4 processor status signal, S2, is derived from OR gate 68 whose inputs include IACK, interrupt/acknowledge cycle, and I/O, input- /output cycle, which are internal control signals derived from the lower execution unit of the processor 10 signifying that the processor 10 is entering an interrupt and acknowledge or input/output instruction cycle. If either one of the inputs to decoder 68 are high, the output is high and is coupled to AND gate 70. The other input to AND gate 70 is $\overline{\text{T4DIFN}}$, wherein T4DIFN signifies that a "T4 of last instruction-do instruction fetch next cycle" condition exists. If an instruction fetch is not indicated and the output of decoder 68 is high, the output of AND gate 70 is true, and is enabled through gate 72, controlled by AND gate 48, to the D input of flip-flop 74, which is internally configured in the same manner as flip-flop 50. The output of flip-flop 74 is coupled to input 76 of logic gate 78. Thus, if inputs 76 and 80 are each high, the output of gate 78 will be low signifying $\overline{S2}$, active low in conformity with the coding of TABLE I. Input 80 of gate 78 is coupled to the Q output of latch 62. Thus, when the external peripheral has indicated that it is ready, input 80 of gate 78 goes low on T3 $\phi$1 and a high output is then coupled to a conventional noninverting tristate output buffer to signify inactive high, $\overline{S2}$.

Alternatively, the output of logic gate 78 is driven low if input 82 goes high. Input 82 is coupled to NAND gate 84 whose input in turn is coupled to NAND gate 86. The output of NAND gate 86 is indicative of the HALT state. Gate 86 in turn has as three inputs, the internal discrete control signals: DHCYC, which is derived from an internal flip-flop indicating that a HALT cycle is to be performed next; the signal $\overline{\text{HOLD}}$, which is an internal control signal instructing internal circuits to halt and hold their status; and the timing signal T1. The output of NAND gate 86 is synchronized through transfer gate 88 by clock $\phi$2, coupled directly to gate 84, and held within a transitory memory comprised of inverters 90 synchronized by clock $\phi$1 through gate 92.

Processor status signal $\overline{S1}$ is similarly derived from OR gate 94 whose inputs are DRCN, do read cycle next and T4DIFN. If either of these signals are high, the output of the OR gate 94 is similarly high. The output of gate 94 is enabled through gate 96 by the output of gate 48 and coupled to the D input of flip-flop 98. Flip-flop 98 is identical to and is controlled in the same fashion as flip-flops 50 and 74. The output of flip-flop 98 is then coupled to one input of NAND gate 100, the other input being coupled to the Q output of latch 62. The output of gate 100 is then coupled to tristate output buffer 44c to generate $\overline{S1}$ active low, indicative of the memory and input/output read and instruction fetch cycles as indicated in TABLE 1. Each of the tristate output buffers 44a, 44b and 44c are tristated by the internal discrete control signal, control tristate, $\overline{\text{CTLTRI}}$. This signal tristates $\overline{S2}$-$\overline{S0}$ when an alternate dedicated processor is to take control of the local bus.

Figure 5:
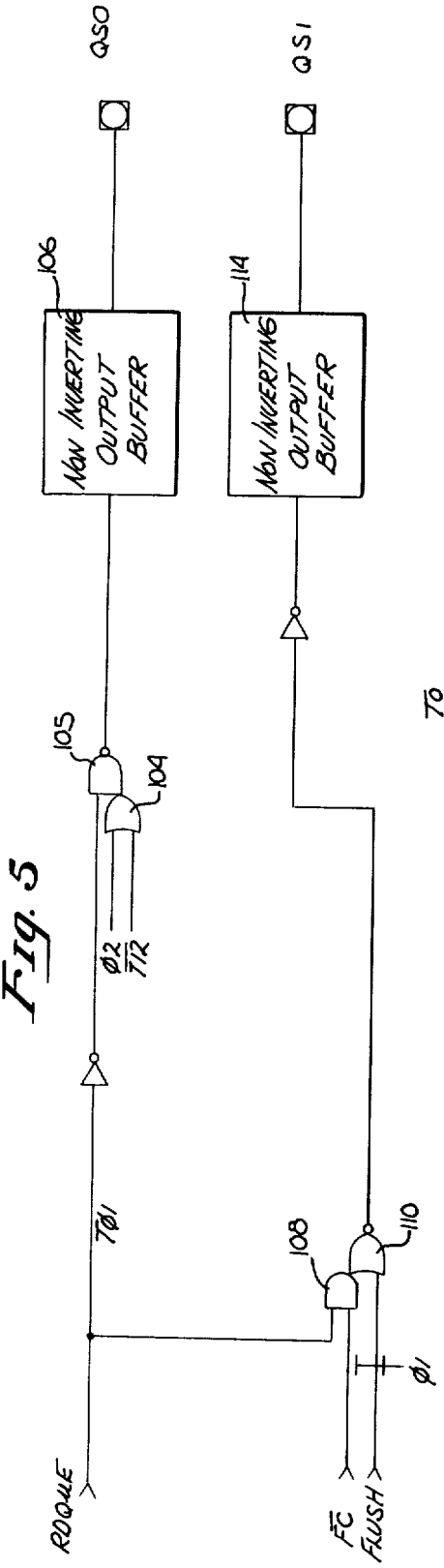
FIG. 5 is a simplified schematic illustrating the queue status circuitry within the central processor.

FIG. 5 illustrates that portion of timing and logic circuitry 42 and output buffers 44 which generates the queue status signals QS0 and QS1. For example, consider the queue status signal QS0. Internal discrete control signal read queue, RDQUE, is synchronized by $\phi$1, inverted and coupled to NAND gate 102. The other input of NAND gate 102 is coupled to OR gate 104 whose inputs are the timing clocks $\phi$2 and $\overline{\text{T12}}$. The signal, $\overline{\text{T12}}$, is a specialized timing signal generated by timing generator 40 which is low during the coincidence of the T1 and $\phi$2 clocks. The output of NAND gate 102 is coupled to a conventional noninverting output buffer 106 whose output in turn is coupled to the QS0 pin. RDQUE is a logically decoded signal conventionally generated from a plurality of other internal discrete command signals and is indicative of a byte having been taken out of queue 28. Thus, in conformity with TABLE 2 above, QS0 is true whenever a first or subsequent byte is taken from the queue and is zero whenever the queue is empty or no operation is being performed.

RDQUE is also coupled to AND gate 108 whose other input is the internal discrete control signal from the lower execution unit of the processor, first clock, $\overline{\text{FC}}$ synchronized by $\phi$1. The internal control signal, FC, is described in greater detail in connection with the above referenced copending application, "Extended Address Single and Multiple Bit Micro-processor." The signal, FC, is a one clock pulse wide signal signifying that the first step of a load cycle in the lower execution portion of processor 10 is being undertaken. The output of AND gate 108 is coupled to NOR gate 110 whose other input is the internal discrete control signal, FLUSH, synchronized by clock $\phi$1. FLUSH is decoded from the lower execution portion of the processor and instructs the upper portion of the processor to disregard the contents of the queue. Typically, this internal discrete control signal is generated when a branch in the program is taken and the bytes within the queue are, momentarily, no longer sequentially decoded and executed. The output of NOR gate 110 is inverted and coupled to a conventional noninverting output buffer 114. The output of buffer 114 is coupled to the QS1 terminal. Thus, whenever the processor is in the first clock mode, or a byte has not been taken out of the queue and the contents of the queue are not to be disregarded, QS1 will be false indicating that the first byte of code has been taken from the queue or that no operation is being executed as verified by the encoding of TABLE 2.

As part of FIG. 5 but not shown therein the signal LCK, is an internal discrete control signal which is specifically decoded from a software instruction from the lower execution portion of the processor. LCK is coupled to a conventional noninverting tristate output buffer whose output in turn is coupled to the $\overline{\text{LOCK}}$ terminal thus, LCK is equivalent to Lock except for the tri-state buffering of LOCK. Although the presently illustrated embodiment had been shown in simplified diagrammatic form in FIGS. 4 and 5, it must be understood that many other modifications and alterations may be made without departing from the spirit of the scope of the present invention. For example, it is possible to provide a minimum/maximum signal to selectively configure the processor to present one of a plurality of operational modes to the outside world. For example, to operate as a concurrent processor as disclosed herein, or as a unitary processor not associated with another processor in a cooperative role.

The request/grant portion of timing logic circuitry 42 of FIG. 2 is best illustrated in FIG. 6. The request/grant terminals are each bidirectional terminals which are used in the three-pulse hand shake between processor 10 and processor 12 in regard to arbitration of local bus 14. Consider, for example, request/grant signal, $\overline{\text{REQ0}}$. A request generated by processor 12, is received on $\overline{\text{REQ0}}$ and coupled to the $\overline{\text{L}}$ input of D-type load flip-flop 118. As described below, the $\overline{\text{REQ0}}$ terminal is coupled to a pull-up device 160, pull-down device 154 and a trickle device 161 which is designed to be of such size that the voltage at $\overline{\text{REQ0}}$ can be sufficiently changed by typical external signals on the local bus. Devices 154 and 160 selectively pull the voltage on $\overline{\text{REQ0}}$ up or down in response to the request/grant protocol as described below.

The output of gate 124 is coupled to one input of OR gate 150 and to driver 152 synchronized by clock $\phi 1$. The output of driver 152 has its output coupled to pull-down device 154 which is coupled between the $\overline{\text{REQ0}}$ terminal and ground. The output of OR gate 150 is coupled to one input of NAND gate 156. The other input of NAND gate 156 is coupled to RESET which is normally true. The output of gate 156 in turn is coupled to driver 158 synchronized by clock $\phi 1$. The output of driver 158 in turn is coupled to a pull-up device 160 coupled between the power supply and $\overline{\text{REQ0}}$.

$\overline{\text{REQ0}}$ is also inverted and coupled to gate 120 which gates a new input signal to the D input terminal of flip-flop 118 only when $\overline{\text{REQ0}}$ goes active low. The D input is derived from OR gate 122 whose inputs include the inverted Q output of flip-flop 118 and the output of NOR gate 124. Assume that the circuit has been initialized and that all flip-flops have been reset or set as required, and in particular that flip-flop 118 has been initially reset. As will be seen, NOR gate 124 will then have a low output. Thus, when $\overline{\text{REQ0}}$ goes low, flip-flop 118 will load in the value at the D terminal, a one, since its Q output was initially zero and consequently the output of OR gate 122 true. A full T clock is required to load flip-flop 118 since it has two coupled inverter stages, the first synchronized by $\phi 1$ and the second by $\phi 2$. Accordingly, a zero cannot be loaded into flip-flop 118 through OR gate 122 until the next load cycle.

The output of flip-flop 118 is designated as a request/grant signal RGA. RGA is coupled to one input of NAND gate 123. Assume for the purposes of illustration that $\overline{\text{REQ1}}$ is inactive so that the Q output of flip-flop 126, the request/grant signal, RGE, remains in the initialized set condition. Therefore, RGE coupled to gate 123 is also true. The other input to gate 123 is derived from NAND gate 128. NAND gate 128 in turn has as one input internal discrete control signal, LCK, described above synchronized by $\phi 1$. Again, for the purpose of illustration, assume that the LCK signal is inactive. The other input to NAND gate 128 is coupled to the Q output of flip-flop 130 which is designated as the request/grant signal, RGB. Initially, RGB is set, therefore the output of gate 128 is also true. Since each of the inputs to NAND gate 123 are thus true, the output is zero which is synchronized by gate 132 and coupled to the D input of flip-flop 130. The driving signal for gate 132 will be described in detail below, but for the present purposes may be taken to be equivalent to the timing signal T2. A zero will then be loaded into flip-flop 130 in response to a local bus request generated by processor 12 and received on $\overline{\text{REQ0}}$.

RGB is then coupled to NAND gate 134 whose other input is coupled to RGE. Again, RGE is assumed to be true since $\overline{\text{REQ1}}$, in the example, is inactive. The output of NAND gate 134 is true and coupled to driver 136. Thus, internal control signal, HOLD, goes true indicating to the internal circuitry of processor 10 that an external master is requesting control of the local bus.

The output of driver 136 is also coupled through an inverter to one input of AND gate 138. The other input of AND gate 138 is the internal discrete control signal, local bus request, LREQ, wich signifies that processor 10 desires to have control of the local bus. Thus, once HOLD has gone true, gate 138 is disabled. In such a case, the zero output of gate 138 is coupled to OR gate 140 whose other input is the internal timing signal, T1. The output of OR gate 140 is in turn coupled to NAND gate 142 which drives synchronization gate 132. Normally processor 10 will not be in an idle state and therefore the output of OR gate 140 will be true thereby allowing gate 142 to drive synchronization gate 132 on clock T2 unless the internal discrete control signal, FIRST, goes active on one input of OR gate 144. If the first byte of a multiple byte instruction is being fetched, gate 142 will then be disabled and a request for the local bus from processor 12 will be ignored. In summary, all external requests will be ignored unless the processor 10 is in an idle state and is either not requesting the local bus or has brought HOLD true or alternatively is not fetching the first byte of a multiple byte instruction.

$\overline{\text{REQ0}}$ has now been driven low by an external request generated by processor 12 indicated by the falling edge of pulse 162 in FIG. 7 and HOLD has been activated. Flip-flop 130 has an advanced $\overline{\text{Q}}$ output, $\overline{\text{QA}}$ which is coupled through an inverter to one input of NOR gate 124. As will be described below, when the output of NOR gate 124 goes high, the circuit of FIG. 6 will pull $\overline{\text{REQ0}}$ low and visa versa. Assuming that processor 10 is not entering an idle state and thereby TI is low, gate 148 will isolate flip-flop 146 from flip-flop 130. $\overline{\text{QA}}$, which will then be a logical zero, will be coupled to one input of NOR gate 124 while $\overline{\text{TI}}$ is true. Flip-flop 146 will have remained set in the initialized condition and its QA output will be false. Therefore, the output of NOR gate 124 will be low. $\overline{\text{REQ0}}$ is pulled high as indicated by the rising edge of pulse 162 in FIG. 7 by a means described below.

RGB from flip-flop 130 also coupled to the D input of load type flip-flop 146 through gate 148. Gate 148 is driven the timing signal T IDLE, TI. Thus, when processor 10 reaches the end of a bus cycle the internal timing signal TI will be generated and if a HOLD has been previously generated, a zero it will be coupled to the D input of flip-flop 146. However, it will require one clock period for the zero to propagate through flip-flop 146. In the meantime the inputs to NOR gate 124 will cause gate 124 to go high since TI has gone active low, since flip-flop 130 is reset indicating a HOLD, and since flip-flop 146 has not yet been reset. Consequently, $\overline{\text{REQ0}}$ will be driven low as illustrated by the falling edge of pulse 164 in FIG. 7. When the zero propagates through flip-flop 146, gate 124 will go low. The $\overline{\text{QA}}$ output of flip-flop 146 is then coupled to NOR gate 124.

When processor 12 has finished its bus cycle and is prepared to return control of local bus 14 to processor 10 it will pull $\overline{\text{REQ0}}$ low again as illustrated by the falling edge of pulse 166. Flip-flop 118 will then be loaded. However, at this point the output of NOR gate 124, having a logical one as an input from flip-flop 146, is generating a false output. The false output signal is coupled through OR gate 122 to the D input of flip-flop 118 and transmitted on the output thereof as RGA. A one is generated by gate 123 and appropriately loaded into flip-flop 130. HOLD then goes inactive, the output of gate 124 goes low and $\overline{\text{REQ0}}$ is pulled high. TI will then go high.

Both $\overline{\text{REQ0}}$, after inversion, and the output of NOR gate 124 are coupled to the inputs of an exclusive OR gate 168. Exclusive OR gate 168 is part of circuitry which prevents the circuitry of FIG. 6 from pulling REQ0 high immediately after request pulse 162 has been generated by processor 12, and also generates the rising edges of pulses 162, 164 and 166 in FIG. 7. The output of gate 168 is coupled to a pull-up device 172 which is clocked on φ2 through a transmission gate 174 to inverter 170 whose output in turn is coupled to OR gate 150. The output of gate 168 is also inverted and coupled to a transmission gate 176, the output of which is coupled to the input of transmission gate 174. Gate 176 selectively couples gate 174 to $\overline{REQ0}$. Whenever processor 12 pulls $\overline{REQ0}$ low and no grant is being generated by processor 10, $\overline{REQ0}$ will be pulled high after one clock cycle. One clock cycle after $\overline{REQ0}$ goes low it will be pulled high for one clock cycle by pull-up device 160 and maintained in the high state by a self-biased trickle device 161. For example, when $\overline{REQ0}$ goes low it is inverted and propagated along line 163. If grant line 165 is inactive, that is false, a one will be generated by gate 168. Device 172 will place a one on node 167. A zero will be generated by gate 150 and $\overline{REQ0}$ ultimately pulled high after one clock. When $\overline{REQ0}$ goes true, a zero will then be propagated on line 163 and provided as an input to gate 168. The output of gate 168 will then be zero, thereby enabling gate 176 and pulling node 167 to zero. After one clock period the output of gate 150 will go true thereby disenabling pull-up device 160. However, since $\overline{REQ0}$ was high, trickle device 161 will maintain $\overline{REQ0}$ in the high state until once again pulled low by an external bus signal.

Gate 168 provides for the exceptional condition that when grant line 165 is active high, and $\overline{REQ0}$ is low, node 167 will not be pulled high by gate 172 as would typical be the case. Rather, if a grant pulse is generated by processor 10 during this first clock, i.e. when the output of gate 24 goes high, a one is synchronously coupled to exclusive OR gate 168 during clock o1. $\overline{REQ0}$ is coupled through transmission gate 176 and the circuitry is prevented from driving pull-up driver 158. $\overline{REQ0}$ will therefore remain active low without a high spike during the request/grant cycle.

The circuitry for $\overline{REQ1}$ is identical to that described with respect to $\overline{REQ0}$ and is illustrated in FIG. 6, with the exception that $\overline{REQ0}$ has priority over that of $\overline{REQ1}$. For example, OR gate 178 couples the signals RGA and LCK into one input terminal of NAND gate 180 which serves an analogous role to that of gate 128 of the $\overline{REQ0}$ circuitry. Thus, if RGA is active, flip-flop 126 will be fixed in the set state and a hold will not be generated. However, as discussed above, the output of flip-flop 126, RGE, is coupled to NAND gate 123 such that, if flip-flop 126 should be active, indicating that a hold request has been accepted on $\overline{REQ1}$, flip-flop 130 will similarly be fixed in a set state and will refuse to generate a hold state in response to any request received on $\overline{REQ0}$.

The Dedicated Co-Processor

In the illustrated embodiment, which is used only for the purposes of example, processor 10 cooperates with a floating point unit, processor 12, a portion of the architecture of which is illustrated diagrammatically in FIG. 8. It may be appreciated by comparing FIG. 8 with FIG. 2 that many of the upper control elements of processor 10 and 12 are duplicated. This allows processors 10 and 12 to provide simultaneous coprocessing of digital information. For example, processor 12 includes address data buffers 182 and an adder 184 analogous to the address data buffers xx and adder 32 of FIG. 2 for processor 10. Similarly, processor 12 includes a register file which simulates portions of the operative register file 30 of processor 10 in that an operand address register 186, and instruction address register 188 and a temporary instruction address register 200 are provided. By monitoring the activity on local bus 14, processor 12 uses its intelligence to keep its registers updated. These registers similarly communicate by a bus 202 to an instruction queue 204 which is a replication of the instruction queue 28 of processor 10. A queue bus 206 is provided as an output bus from queue 204 in a substantially similar manner as is provided for processor 10 to communicate with lower execution circuitry of processor 12 which will decode and perform the instructions which have been earmarked for performance or execution within processor 12. A timing generator 208 is substantially similar to timing generator 40 of processor 10 and is alterable by the READY signal to provide the internal T timing and such other specialized timing as is required throughout processor 12. A queue control circuit 210 is provided as a logic circuit for decoding the queue status signals QS0 and QS1, and the processor status signals, S0–S2. Address calculations as may be required by processor 12 and its upper portion may be controlled by appropriate control circuitry such as a conventional microcode circuit 212 or an equivalent PLA control circuit. Address/data buffer 182 is coupled to local bus 14 and, pursuant to queue control circuit 210, queue 204 is loaded in response to decoding performed by queue control circuit 210 of the processor status signals, S0–S2, in a conventional means analogous to that used in processor 10. Therefore, as each byte is fetched by processor 10 it is similarly taken from local bus 14 and circulated through queue 204.

The status of the queue is decoded from QS0 and QS1 according to conventions summarized in TABLE 2 above to indicate what operation is to be executed with respect to bytes stored within queue 204. A byte is coupled through queue bus 206 to a conventional decoder 214 which then determines whether or not the byte fetched is indicative of an instruction which is to be specifically executed by processor 12. In the illustrated embodiment of floating point instruction is comprised of two bytes, the first byte of which is a float prefix described in greater detail with respect to the above referenced copending application entitled "Extended Address, Single and Multiple Byte Microprocessor." The second byte and portions of the first byte of the instruction then identifies which of the floating point instructions have in fact been encountered. Upon detection of the float prefix, conventional decoder logic 216 will generate a triggering signal coupled to grant/request logic circuitry 218. Circuit 218 cooperates with the circuit previously described in connection with FIG. 6 to request and obtain control of local bus 14 to permit processor 12 to have selective access and control to a local, private or system bus if required by a floating point instruction. Thus, a floating point instruction can reference an internal floating point stack and general register file as well as any location in memory. When a floating point instruction has been fetched from queue 204, processor 12 will execute that instruction in parallel with processor 10 while processor 10 continues its instruction sequence.

Processor 10 decodes instructions from the queue and addresses and fetches data according to the instruction sequence, and in particular fetches the floating point operands. When the floating point instruction is decoded from the queue, processor 10 recognizes it as such, calculates an effective address and performs on read. These instructions can use any of the CPU's operand addressing modes to reference any location in memory without maintaining a copy of the CPU's addressing registers internally, and without having to perform the CPU's effective address calculations. Processor 10, after relinquishing local bus 14 to processor 12, will continue with the instruction stream until it requires the result of the past instruction whereupon it checks the status of the TEST pin. If the TEST pin indicates that processor 12 is still executing the instruction, processor 10 will wait until processor 12 changes the logic level of the TEST pin to indicate completion of its execution.

After decoding the float instruction, processor 10 forms an effective address which may require a fetch of the next byte or word from the queue which will be used in the calculation of the operand address. Processor 10 performs a read. Processor 12 then loads the address used during the read into its operand address register 186 and stores the corresponding fetched portion of the operand in a temporary register, INA 188. Processor 12, through request/grant circuitry 218, obtains control of local bus 14 to fetch the remainder of the operand. While processor 12 proceeds to execute the floating point instruction and processor 10 continues to run through the programmed sequence, processor 12 also simultaneously tracks and monitors the status and contents of queue 28 of processor 10 by replicating queue 28 in queue 204.

Figure 9:
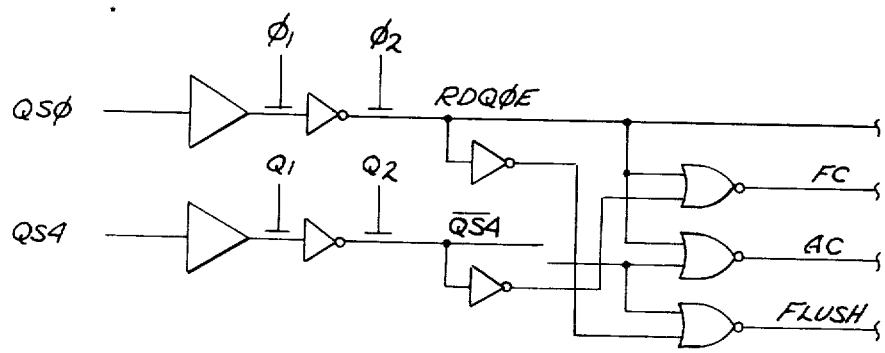
FIG. 9 is a schematic of part of the queue control circuitry of FIG. 8.

Portions of queue control circuit 210 are illustrated in FIG. 9 wherein the internal control signals, read queue RDQUE is generated from QS0 and synchronized by clocks, $\phi 1$ and $\phi 2$. The internal control signals, first cycle, FC; additional cycle, AC; and FLUSH are generated from QS0 and QS1 applied as inputs to conventional NOR gate decoders. The coding of TABLE 2 can be easily verified against the circuitry of FIG. 9 wherein the first cycle, FC, refers to the first byte of a NOP code from the queue, the additional cycle, AC, refers to the subsequent byte from the queue, FLUSH refers to the operation of emptying the queue and RDQUE refers generally to the reading of a first or subsequent byte from the queue.

Figure 10:
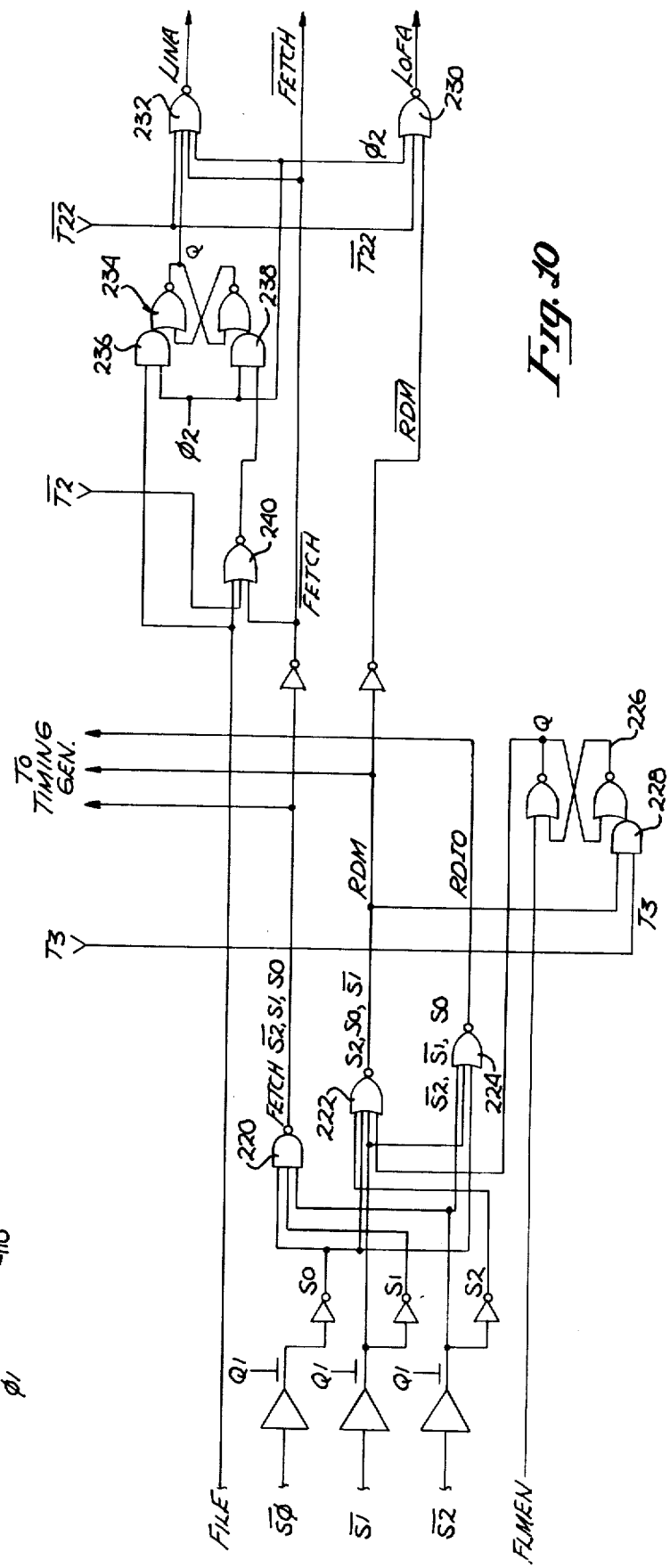
FIG. 10 is a schematic of another portion of the queue control circuitry of FIG. 8.

FIG. 10 shows similar conventional decoding for processor status signals S0–S2. The output of NAND gate 220, FETCH, referring to a code access, will only be true if S2, S1 and S0 assume the status (100) respectively. The internal control signal, read/memory, RDM, is generated by NOR gate 222 only if the processor status signals, S2–S0 assume the state (101). Similarly, the output of NOR gate 224 is only true when S2–S0 assume the state (001), indicating the input/output read operation. RS NOR gate flip-flop 226 has its Q output coupled to one input of NOR gate 222 and has its set input coupled to AND gate 228. The inputs to AND gate 228 are the timing signal T3 and RDM. Thus, on the first T3 cycle after which a read/memory operation is indicated, latch 226 will be set thereby disabling NOR gate 222. The internal control signal, flush memory, FLMEM, is used as the rest input to latch 226.

Read/memory, RDM, is inverted and coupled to NOR gate 230 whose other inputs are $\phi 2$ and the timing signal T22 which is indicative of the T2 and $\phi 2$ timing coincidence. The output of NOR gate 230 is the internal control signal load operand address, LOPA, which causes register 186 to be loaded with proper timing on a memory/read. When an instruction is being fetched, the signal, FETCH, is inverted and coupled to one input of NOR gate 232, whose other inputs are T22, $\phi 2$ and the output of NOR gate latch 234. The output of gate 232 is the internal command signal load instruction address, LINA, which causes register 188 to be loaded with the address of an instruction byte. Latch 234 is reset by AND gate 236 whose inputs are RESET "logical OR" FLUSH and $\phi 2$. Latch 234 in turn is set by the output of AND gate 238 whose inputs are $\phi 2$ and the output of NOR gate 240. NOR gate 240 in turn has the inputs FETCH, $\overline{T2}$ and RESET+FLUSH. Thus, if RESET "OR" FLUSH goes true, latch 234 is reset and gate 232 enabled. However, when each of the inputs to gate 240 are zero, which includes RESET "OR" FLUSH, latch 234 will be reset and gate 232 will be disabled until RESET "OR" FLUSH once again goes true.

While a third instruction address register tracks the address of the instruction which processor 10 is fetching, if a second floating point instruction is decoded while processor 12 is executing a first for which it must actively access the local bus later on such as during a memory write, queue control circuit 212 will insert the second instruction address into register 200, the temporary instruction address register TINA. After the first floating point instruction has been fully executed, queue control circuit 210 will insert the contents of TINA register 200 into INA register 188 and execute the second floating point instruction in the same manner. The same is true for the temporary data address register.

Figure 11:
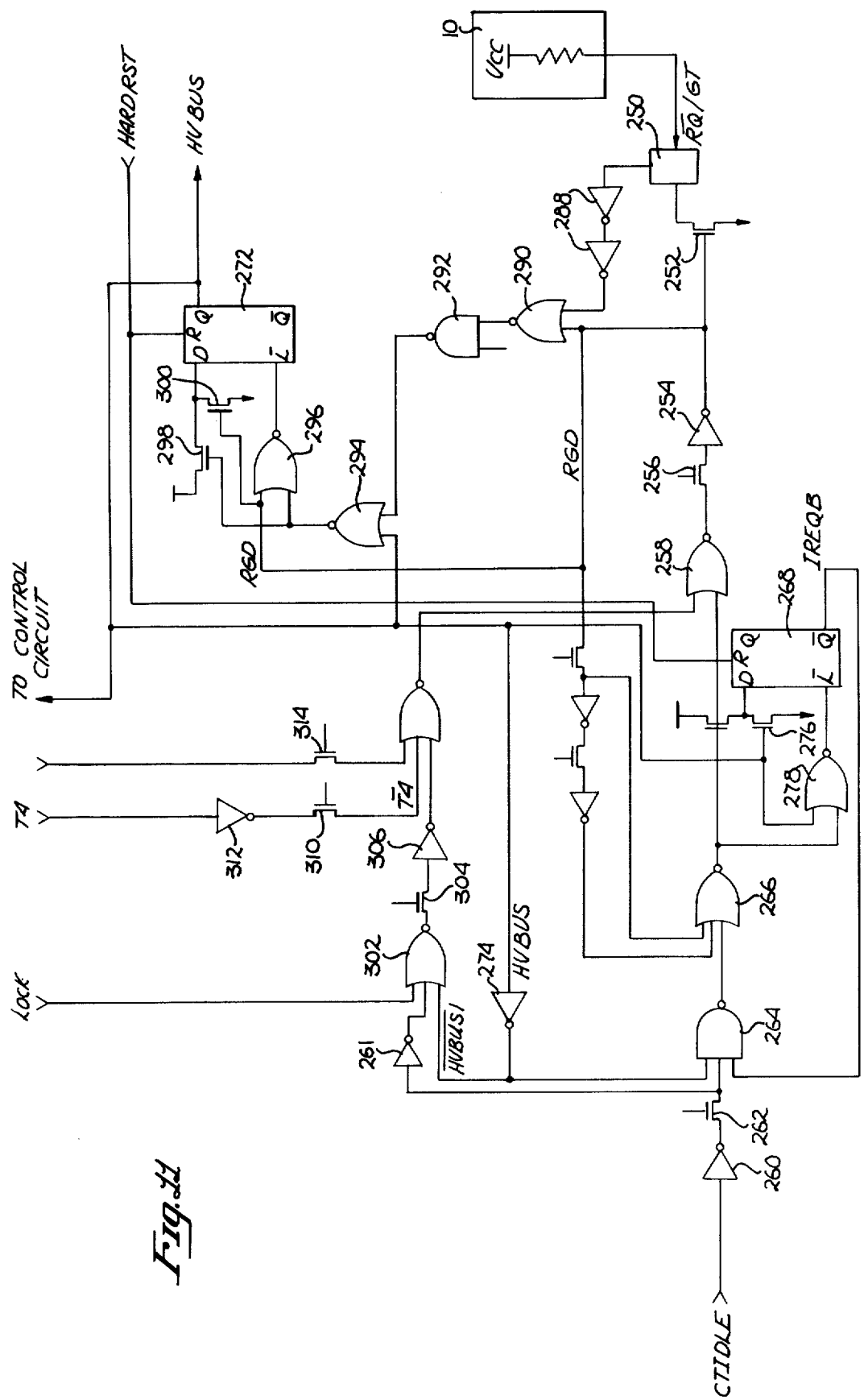
FIG. 11 is a simplified schematic of the grant/request logic circuitry of FIG. 8.

FIG. 11 illustrates circuitry which may be employed as the request/grant logic circuitry 218 of processor 12. Request/grant pin 250 is coupled to a pull-down device 252 which in turn is driven through an inverter 254 and transmission gate 256 clocked by $\phi 1$. The input to transmission gate 256 is derived from the output of NOR gate 258. When the output of NOR gate 258 goes low it will synchronously be coupled to inverter 254 which in turn will activate device 252 thereby pulling down request grant pin 250.

Inverter 260 is coupled to the internal command signal circuit idle, CTIDLE. CTIDLE signifies the state wherein processor 12 has no need for access to the local bus. Conversely, $\overline{\text{CTIDLE}}$ indicates active state in which processor 12 will generate a bus request such as illustrated as pulse 162 of FIG. 7. When access is required, CTIDLE goes low and a one will be synchonously coupled through transmission gate 262 on clock $\phi 2$ to an input of NAND gate 264. When each of the other two inputs to NAND gate 264 are true the output will be active false which is coupled to an input of NOR gate 266. The output of NOR gate 266 is a signal, Request Set, REQSET. When each of the inputs to NOR gate 266 are false the REQSET will be true and coupled to one input of NOR gate 258. When either input to NOR gate 258 is true, its output is active false and request/grant pin 250 is pulled active low.

Initially D-type lode flip-flop 268 will be reset by the hardware reset signal, HARDRST. The $\overline{Q}$ output of flip-flop 268 is then coupled as one of the inputs to gate 264. D type load flip-flop 272 is initially reset indicative that processor 12 does not have the bus. The Q output of flip-flop 272 is coupled through inverter 274 to gate 264 providing a zero output. The Q output of flip-flop 272, Have Bus, HVBUS, is also coupled to device 276 and one input of NOR gate 278. The other input of NOR gate 278 being coupled to REQSET. The output of NOR gate 278 is coupled to the $\overline{L}$ input of flip-flop 268. Since terminal 250 is initially allowed to float high, the output of inverter 254, must be false. Inverter 254 is synchronously coupled through gate 280 by clock $\phi 2$, inverter 282, gate 284 by clock $\phi 1$ and inverter 286. The output of gate 280 is directly coupled to one input of NOR gate 266. Thus, each of the inputs to NOR gate 266, except the output of gate 264, are initially false. Therefore, in the initialized condition, REQSET will go true when the output of NAND gate 264 goes false in response to CTIDLE going false. It should be noted when pin 250 goes low, RGD which goes high is ultimately coupled to the input of gate 266 one T clock later. REQSET then goes low and pull-down device 252 is disabled. As described above, this allows the pull-up circuitry of FIG. 6 to pull the $\overline{REQ0}$ pin high, which pin is coupled to pin 250.

Request/grant pin 250 is coupled through two inverters 288 to an input of NOR gate 290. The other input of NOR gate 290 is RGD. The output of gate 290 is coupled to the input of NAND gate 292 whose other input is a clock $\phi 1$. The output of gate 292 is coupled to one input of NOR gate 294 whose other input is HVBUS. The output of gate 294 in turn is coupled to one input of NOR gate 296 whose output is coupled to the $\overline{L}$ input of flip-flop 272. The other input of gate 296 is RGD. The output of gate 294 is similarly coupled to a pull-up device 298 which in turn is coupled to the D input of flip-flop 272. RGD is coupled to pull-down device 300 which is similarly coupled to the D input of flip-flop 272. Thus, in an initial condition, when output pin 250 is true, a one is coupled to one input gate of 290 which then has a zero output. A constant one is generated by gate 292 and coupled to the input of gate 294 which will then have a zero output. Since RGD is initially zero, flip-flop 272 will not be loaded and will remain in the reset condition.

However, when processor 10 requests the bus and pulls pin 250 low, RGD will go true. The output of gate 290 remains false. However, flip-flop 272 is now in a load state and pull-down device 300 activated. Thus, a zero is loaded into flip-flop 272. When processor 10 generates a CPU grant, as illustrated by pluse 164 FIG. 7, CTIDLE will be inactive and pin 250 pulled low. RGD will thus be false and the output of gate 290 true. $\phi 1$ will be coupled by gate 292 to the input of gate 294. During clock $\phi 1$, gate 294 will generate a true output which will again set flip-flop 272 into the load state. Pull-up device 298 will be activated and a one will be loaded in flip-flop 272 bringing HVBUS active true. HVBUS then indicates to the external local bus that processor 12 has requested and obtained a grant to the local bus.

Meanwhile, when processor 12 first requested the bus but did not yet have it, the output of NOR gate 278 went false setting flip-flop 268 into the load state. At such time HVBUS was false and REQSET true such that pull-up device 270 was enabled. A one was therefore loaded into internal request bus flip-flop 268. A zero was fed back to gate 264 from the Q output of flip-flop 268 to disable gate 264 and fix REQSET to zero. When processor 12 acquired the bus and set HVBUS high, flip-flop 268 was again set into the load state, but pull-down device 276 enabled while pull-up device 270 was disabled thereby loading a zero into flip-flop 268 to permit the acceptance of a subsequent local bus request from processor 12.

However, when HVBUS went active high, gate 264 was disabled by the output of inverter 274. When CTIDLE again goes high indicating that processor 12 is done with a bus, a zero will be coupled to one input of NOR gate 302 through inverters 260 and 261. The output of gate 302 is synchronously coupled through transmission gate 304 by clock $\phi 2$ to inverter 306. The other inputs of NOR gate 302 are coupled to $\overline{HVBUS}$ and the signal LCK which was described above. Thus, when processor 12 does not have the bus, gate 302 will be disabled. However, when processor 12 does have the bus, $\overline{HVBUS1}$ goes false. Assuming that LCK is false, as is typically the case, a one, generated by gate 302, is coupled to inverter 306 whose output in turn is coupled to NOR gate 308. The output of NOR gate 308 is coupled to one of the inputs of NOR gate 258. When each of the inputs to NOR gate 308 are false, the output is true thereby enabling gate 258 and pulling pin 250 active low thereby generating a bus release pulse 166 as illustrated in FIG. 7. The other inputs to NOR gate 308 are $\overline{T4}$ synchronously coupled through gate 310 by clock $\phi 2$ from inverter 312 and the internal control signal advanced ready, ADRRDY synchronously coupled through gate 314 by clock $\phi 2$. ADRRDY is internal control signal indicative of the condition where the control section is about to start a bus cycle on the next clock.

Thus is can be appreciated that when ADRRDY is active, gate 308 is disabled thereby preventing processor 12 from generating or grant to give up the bus. Moreover, the bus can be surrendered through NOR gate 308 only during the last T cycle of a bus transfer, namely T4. In the case where LCK is active, processor 12 is instructed not to surrender the local bus under any conditions. In this case a one is coupled to the input of NOR gate 302 thereby fixing the output at zero. This in turn disables gate 308.

When gate 308 indicates a surrender is to be made by going active, RGD will again be false and $\overline{\phi 1}$ will be coupled to gate 294. A zero will be reloaded into flip-flop 272 and the circuitry of FIG. 11 restored to its initialized condition.

It must be understood that many modifications and alterations may be made without departing from the spirit and scope of the present invention as set forth in the claims below. The present invention has been described in terms of a particular embodiment only for the purposes of illustration and does not limit the scope of the invention. For example, the request/grant circuitry illustrated in FIG. 11 may have many other organizations other than that described and depicted while still exhibiting the protocol exchanged between processors 10 and 12 as illustrated in FIG. 7. Similarly, the internal organization referenced with respect to processors 10 and 12 as shown in FIGS. 2 and 8 respectively need not be incorporated in order for two processors to process digital information according to the present invention.

We claim:

1. A circuit for providing arbitration of a bus between a first and second processor mutually coupled to a bus, each processor being arranged and configured to execute at least one predetermined type of instruction not entirely executable by the other processor, wherein said first processor fetches all instructions and wherein said second processor detects at least one predetermined type of instruction executable therein, said circuit comprising:

first bidirectional means in said first processor for receiving a bus request signal indicative of a request from said second processor to said first processor for access and control of said bus, for selectively generating a bus grant signal indicative of release by said first processor of access and control of said bus, and for receiving a bus release signal indicative of a release by said second processor to said first processor of access and control of said bus;

second bidirectional means in said second processor for selectively generating said bus request signal in response to said second processor having detected said one predetermined type of instruction executable in said second processor, for receiving said bus grant signal, and for selectively generating said bus release signal;

wherein said first processor includes a means for transmitting a plurality of status signals indicative of the type of transfer cycle being performed by said first processor; and whereby a plurality of instructions may be cooperatively processed in a concurrent manner in said first and second processors.

2. The circuit of claim 1 wherein said first processor includes means for generation of a LOCK signal in response to a predetermined instruction and transmits said LOCK signal to said second bidirectional means of said second processor, said second processor retaining access and control of said bus through said second bidirectional means when access and control has previously been granted to said second processor.

3. A circuit to selectively provide access and control of a bus between at least a first and second processor, said first and second processors each being arranged and configured to execute at least in part at least one predetermined type of instruction nonexecutable in total by said other processor, comprising:

first means in said first processor for generating a plurality of status signals indicative of the operational status of said first processor and for transmitting said plurality of status signals to said bus;

second means in said second processor for receiving said plurality of status signals from said bus and for decoding said plurality of status signals to track said operational status of said first processor;

third means in said second processor for selectively requesting access and control over said bus in response to detection by said second processor of said at least one predetermined type of instruction; and fourth means in said first processor for selectively granting access and control over said bus to said second processor in response to a request therefrom;

whereby the execution of instructions may be cooperatively distributed between said first and second processor for concurrent instruction stream execution.

4. The circuit of claim 3 wherein said third means also selectively relinquishes access and control over said bus to said first processor.

5. The circuit of claim 3 wherein said plurality of status signals include a first plurality of signals indicative of the operational type of the bus transfer cycle being run by said first processor, said transfer cycle to be executed next.

6. The circuit of claim 3 or 5 wherein said plurality of status signals include a second plurality of signals indicative of the operational status of an instruction storage queue within said first processor.

7. The circuit of claim 3 wherein said first and second processor are coupled to a common clock circuit and are each synchronized therewith.

8. The circuit of claim 3 wherein said third and fourth means generates a bidirectional request/grant signal characterized by having at least three states, a request state wherein said second processor selectively seeks access and control of said bus from said first processor through said third and fourth means, a grant state wherein said first processor selectively grants access and control of said bus to said second processor through said fourth and third means, and a release state wherein said second processor selectively releases access and control of said bus to said first processor through said third and fourth means, said selective seeking of access and control of said bus by said second processor being in response to detection by said second processor of at least one of said type of instructions executable by said second processor.

9. The circuit of claim 6 wherein said first processor includes means for continuing to execute instructions from said storage queue when said second processor has access and control of said bus and wherein said first processor includes means for selectively delaying reacquisition of access and control of said bus while using said bus and at least one other common and private bus to transfer digital information as required by instructions within said second processor.

10. The circuit of claim 6 wherein said first processor includes means for continuing execution of instructions from an instruction stream while said second processor is executing an instruction and wherein said first processor includes means for selectively delaying execution of a subsequent instruction within said first processor in response to a TEST signal from TEST means for generating said TEST signal when execution within said second processor is incomplete, said means for delaying being activated when said first processor requires completed results of said execution within said second processor.

11. In combination with a first processor having a means for storing and queuing a plurality of instructions, said first processor having selective access and control to a local bus shared by said first processor and at least a second processor, a circuit comprising:

first means in said first processor for generating a plurality of queue status signals indicative of the status of said means for storing and queuing instructions said queue status signals transmitted to said local bus;

second means in said first processor for generating a plurality of processor status signals indicative of the operation then being performed by said first processor, said processor status signals transmitted to said local bus; and third means in said first and second processor for selectively controlling access of said second processor to said shared local bus, whereby the operational status of said first processor is transmitted to said shared local bus and whereby said first processor may control access over said shared local bus as determined by requests received from said second processor by said first processor in response to said queue, processor status signals, and instruction decoding within said first processor.

12. The circuit of claim 11 wherein said circuit is included in part within said second processor and further comprises:
fourth means for receiving said queue and processor status signals, for tracking said operation then being performed by said first processor; and
for replicating in said second processor said means for storing and queuing instructions in said first processor; and
fifth means for detecting at least one predetermined one of said plurality of instructions for execution within said second processor, and for communicating with said third means to selectively cause said first processor to temporarily relinquish access and control over said local bus and to temporarily give said second processor access and control over said local bus;
sixth means for monitoring said second processor to determine whether said second processor has concluded execution and is available for further execution;
whereby said plurality of instructions are cooperatively and concurrently coprocessed by said first and second processors whereby digital processing capacity is extended and increased.

13. The circuit of claim 11 in further combination with a common bus and means for arbitrating access and control over said common bus, said circuit further comprising:
seventh means in said first processor for selectively generating a LOCK signal and for transmitting said LOCK signal to said means for arbitrating access and control over said common bus and to said second processor, said LOCK signal being indicative of an instruction executed in said first processor to unconditionally retain access and control over said common bus for at least said first and second processors for at least a first bus transfer cycle.

14. The circuit of claim 13 further comprising:
eighth means in said second processor for selectively generating said LOCK signal and for transmitting said LOCK signal to said means for arbitrating access and control over said common bus to unconditionally retain access and control over said common bus on a bus transfer cycle subsequent to said first bus transfer cycle.

15. A method for processing digital information in at least a first and second processor, each having selective access and control to a bus, comprising the steps of:
selectively generating a bus request signal in a second bidirectional means in said second processor in response to detection of an instruction executable in said second processor, said instruction fetched by said first processor;
transmitting said bus request signal to said bus;
receiving said bus request signal in a first bidirectional means in said first processor;
selectively generating a bus grant signal in said first bidirectional means when said first processor no longer requires access and control of said bus and releasing access and control to said bus;
transmitting said bus grant signal to said second bidirectional means;
acquiring access and control to said bus by said second processor in response to the receiving of said bus grant signal, selectively releasing access and control of said bus by said second processor;
acquiring access and control of said bus by said first processor;
whereby instructions fetched onto said bus may be cooperatively and concurrently processed in said first and second processors.

16. The method of claim 15 further comprising the step of selectively inhibiting release of said bus by said second processor by generation of a LOCK signal by said first and second processors in response to a predetermined instruction, transmitting said LOCK signal to the means for arbitrating access and control of a common bus and inhibiting bus release in response thereto.

17. A method for processing digital information in a plurality of processors sharing a local bus and having selective access and control to at least one of a common bus and private bus, at least a first processor of said plurality of processors having means for storing and queuing instructions said method comprising the steps of:
generating a plurality of queue status signals and processor status signals in said first processor, said queue status signals indicative of the status of said means for storing and queuing instructions, said processor status signals indicative of the operation then being performed by said first processor;
transmitting said queue and processor status signals to said local bus; and
selectively controlling access to said local bus in response to requests received by said first processor from a second processor of said plurality of processors,
whereby operation of said first processor may be tracked by said second processor, said first and second processors cooperatively and concurrently coprocessing said instructions on said local bus.

18. The method of claim 17 wherein the step of selectively controlling access to said local bus includes the steps of:
receiving said queue and processor status signals from said local bus by said second processor;
tracking and replicating the operation and means for storing and queuing instructions of said first processor in said second processor;
detecting at least one of said instructions as being designated for execution by said second processor; and
requesting said first processor to temporarily relinquish access and control over said local bus and to temporarily give said second processor access and control over said local bus while permitting said first processor to continue to operate in a nonaccessing mode.

19. The method of claim 17 in further combination with means for arbitrating access and control over said common bus further comprising the steps of:
selectively generating a LOCK signal; and
transmitting said LOCK signal to said means for arbitrating access and control over said common bus, said LOCK signal being indicative of an instruction in said first processor to unconditionally retain access and control over said system bus for said plurality of processors.

20. The method of claim 19 wherein said LOCK signal is generated in at least one of said first and second processors.

21. The method of claim 17 wherein the step of selectively controlling access to said local bus is further in response to a TEST signal generated by said second processor, said first processor being inhibited from accessing said local bus in response to said TEST signal when an operand result computed by said second processor is required by said first processor and unavailable from said second processor, whereby an instruction stream is concurrently processed by said first and second processors in a cooperative manner.

* * * * *